US012123539B2

(12) United States Patent
Groß

(10) Patent No.: US 12,123,539 B2
(45) Date of Patent: Oct. 22, 2024

(54) THERMAL INSULATION MATERIAL AND METHOD FOR ITS PRODUCTION

(71) Applicant: Lucia Groß, Oberiberg (CH)

(72) Inventor: Lucia Groß, Oberiberg (CH)

( * ) Notice: Subject to any disclaimer, the term of this patent is extended or adjusted under 35 U.S.C. 154(b) by 1603 days.

(21) Appl. No.: 16/373,898

(22) Filed: Apr. 3, 2019

(65) Prior Publication Data

US 2019/0309891 A1 Oct. 10, 2019

(30) Foreign Application Priority Data

Apr. 10, 2018 (EP) .................................. 18 166 567

(51) Int. Cl.
| | |
|---|---|
| *F16L 59/02* | (2006.01) |
| *B27L 11/02* | (2006.01) |
| *B27N 3/00* | (2006.01) |
| *B27N 3/12* | (2006.01) |
| *C08L 1/02* | (2006.01) |
| *C08L 97/02* | (2006.01) |
| *E04B 1/76* | (2006.01) |
| *E04B 1/80* | (2006.01) |
| *B27L 11/04* | (2006.01) |
| *B27L 11/06* | (2006.01) |
| *B27N 3/02* | (2006.01) |
| *B27N 3/04* | (2006.01) |

(Continued)

(52) U.S. Cl.
CPC .............. *F16L 59/028* (2013.01); *B27L 11/02* (2013.01); *B27N 3/007* (2013.01); *B27N 3/12* (2013.01); *C08L 1/02* (2013.01); *C08L 97/02* (2013.01); *E04B 1/7604* (2013.01); *E04B 1/80* (2013.01); *B27L 11/04* (2013.01); *B27L 11/06* (2013.01); *B27N 3/02* (2013.01); *B27N 3/04* (2013.01); *B27N 3/10* (2013.01); *C08L 2205/16* (2013.01); *E04B 2001/745* (2013.01); *F16L 59/04* (2013.01)

(58) Field of Classification Search
CPC .......... B27L 11/02; B27L 11/04; B27L 11/06; B27N 3/007; B27N 3/02; B27N 3/04; B27N 3/10; B27N 3/12; C08L 1/02; C08L 2205/16; C08L 97/02; E04B 1/7604; E04B 1/80; E04B 2001/745; E04B 1/74; E04B 2001/742; F16L 59/028; F16L 59/04; C04B 2111/28; C04B 30/00; C04B 18/24; C04B 18/26; Y02W 30/91

See application file for complete search history.

(56) References Cited

U.S. PATENT DOCUMENTS

| | | |
|---|---|---|
| 2002/0121327 A1 | 9/2002 | Mente et al. |
| 2013/0300015 A1 | 11/2013 | Baroux |

FOREIGN PATENT DOCUMENTS

| | | |
|---|---|---|
| DE | 195 16 186 | 11/1996 |
| DE | 10 2004 024 551 | 12/2005 |

(Continued)

*Primary Examiner* — Shuangyi Abu Ali
(74) *Attorney, Agent, or Firm* — Gudrun E. Huckett

(57) ABSTRACT

A thermal insulation material is made of a plurality of insulating components. The plurality of insulating components includes a first insulating component made of wood shavings. The plurality of insulating components includes a second insulating component made of cellulose fibers, wherein the cellulose fibers are arranged in voids formed between the wood shavings. The cellulose fibers of the second insulating component are produced from decor paper or sanitary paper.

13 Claims, 2 Drawing Sheets

(51) Int. Cl.
*B27N 3/10* (2006.01)
*E04B 1/74* (2006.01)
*F16L 59/04* (2006.01)

(56) References Cited

FOREIGN PATENT DOCUMENTS

| EP | 0 627 978 | 8/1997 | |
|----|-----------|--------|---|
| EP | 2 045 408 | 4/2009 | |
| EP | 2045408 A2 * | 4/2009 | ............. C04B 18/24 |
| EP | 2 813 629 | 12/2014 | |

* cited by examiner

THERMAL INSULATION MATERIAL AND METHOD FOR ITS PRODUCTION

BACKGROUND OF THE INVENTION

The invention concerns a thermal insulation material comprised of at least two insulating components, wherein the first component comprises wood shavings and the second component cellulose fibers, wherein the cellulose fibers are arranged in voids formed between the wood shavings. The invention further concerns a method for its production. The invention concerns moreover a panel with advantageous properties.

EP 2 045 408 A1 discloses a thermal insulation material of the aforementioned kind that is composed of wood chips and cellulose fibers. The thermal insulation material is comprised of loosely mixed wood chips and cellulose fibers. The wood chips form a matrix wherein the cellulose fibers are embedded in the voids between the wood chips.

The invention has the object of providing a thermal insulation material of the aforementioned kind that can be produced from easily available inexpensive starting materials and exhibits good insulation properties.

A further object of the invention resides in providing a method for producing a thermal insulation material.

A further object of the invention resides in providing a panel with advantageous properties.

SUMMARY OF THE INVENTION

The object is solved with regard to the thermal insulation material by a thermal insulation material characterized in that the cellulose fibers of the second component are produced from decor paper or from sanitary paper. In regard to the method, the object is solved by a method characterized in that the wood shavings are produced by chipping wood in the moist state and in that, after chipping, the wood shavings with a residual moisture of at least 15% are mixed with the cellulose fibers. With regard to the panel, the object is solved by a panel comprising wood shavings that are bonded to each other by a binding agent, characterized in that the wood shavings are produced by chipping of a log by means of a conical face milling cutter.

It is provided that the thermal insulation material is composed of at least two insulating components. Additives to the insulating components such as, for example, flame retardants, fungicides, binders or the like, do not themselves form an insulating component in the meaning of the present application. One insulating component comprises wood shavings and a further insulating component comprises cellulose fibers from decor paper or from sanitary paper. It has been found that the cellulose fibers from decor paper or sanitary paper have a particularly low thermal conductivity. Decor paper and sanitary paper are characterized by a high proportion of short fibers. It has been found that these short cellulose fibers can be mixed particularly well with the wood shavings and can be embedded well in the voids formed between the wood shavings. The combination of wood shavings with cellulose fibers from decor paper or sanitary paper results in an insulation material with excellent insulating properties and with a comparatively low settling density. In addition, decor paper and sanitary paper are available easily and inexpensively. Sanitary paper exhibits also a minimal proportion of fillers, in particular dust.

Decor paper in the meaning of the present application is a specialty paper, in particular for surface refinement of wood materials wherein in the present case only decor paper without resin impregnation is to be used. Sanitary paper in the meaning of the present application comprises tissue paper, tissue-like paper as well as paper produced by the airlaid method.

Advantageously, the cellulose fibers of the second component exhibit a maximal fiber length of 12 mm.

It is preferably provided that the wood shavings of the first component are made from wood of deciduous trees. It has been found that, contrary to the previous assumption, wood from deciduous trees has good thermal insulation properties with sufficiently low settling density. In this context, the settling density is the density of the shavings after a predetermined settling, in particular after application of a predetermined testing load for a predetermined period of time. Wood from deciduous trees is undemanding and therefore widely spread. Due to the good availability of wood from deciduous trees, transport distances for the manufacture of the thermal insulation material can be kept low so that the insulation material can be produced ecologically.

In a particularly advantageous configuration, the wood of deciduous trees of the first component is wood of the willow family, in particular wood of poplar (*populus*), aspen (*populus tremula*) or birch (*betula*). Poplar, aspen, and birch have a higher mold resistance and at the same time a lower thermal conductivity in comparison to shavings of wood of coniferous trees. Shavings of poplar, aspen or birch also have a higher mold resistance and lower thermal conductivity than shavings of other types of wood of deciduous trees. Also, insect infestation is significantly lower in wood of deciduous trees of aspen or poplar in comparison to wood of coniferous trees and also other types of wood of deciduous trees. The somewhat increased settling density of poplar and aspen is partially compensated by the lower thermal conductivity so that advantageous properties of the thermal insulation material result. In a particularly preferred configuration it can be provided that the thermal insulation material contains shavings of wood of coniferous trees as a further component. In this way, a characteristic odor of the thermal insulation material can be obtained.

In order to obtain particularly elastic break-proof shavings, it is advantageously provided that the fiber length direction of the wood of the wood shavings extends primarily in longitudinal direction of the wood shavings. In this way, a particularly low settling-proof density of the insulation material is achieved. The settling-proof density can be, for example, lower by one third than that of blown insulation materials of cellulose fibers from recycled paper and the density can be lower by 20% than the density of insulation materials of cellulose fibers from recycled paper in a closed cavity.

Wood shavings in which the fiber orientation of the wood extends primarily in longitudinal direction of the wood shavings can be produced in that the cutting tool, for example, a cutting edge of a milling tool, is moved in a plane parallel to the longitudinal center axis of the log. When the milling tool is moved transverse to the fiber length direction of the wood, each shaving intersects a plurality of tree rings of the wood. This results in a greater density and thus greater raw material need of the thermal insulation material. It has also been found that the shavings thereby are less elastic and break more easily than shavings that intersect no or only a few tree rings. In an alternative embodiment, wood processing waste in the form of shavings or wood fibers can however be provided as wood shavings in which the fiber length direction is not extending primarily in longitudinal direction of the wood.

Advantageously, the wood shavings are produced by chipping a log by means of a conical face milling cutter. The region of the cone of the conical face milling cutter that is in contact with the log is advantageously approximately parallel to the longitudinal center axis of the log. In this way, shavings can be produced whose fiber length direction extends primarily in longitudinal direction of the wood and that are therefore particularly elastic.

The mass proportion of each insulating component of the thermal insulation material amounts advantageously to 10% to 90%. In this context, the thermal insulation material may contain precisely two components. A higher number of components may also be advantageous however. In the present case, a component is considered to be an insulating material which is producible from a starting material in a uniform manufacturing process. For example, wood shavings and cellulose fibers from the same starting material provide two components. Also, cellulose fibers of different starting materials, for example, cellulose fibers from wood, cellulose fibers from natural fibers, cellulose fibers from sanitary paper, and cellulose fibers from decor paper constitute different components.

In a particularly advantageous configuration, the mass proportion of each insulating component of the thermal insulation material amounts to 10% to 80%, in particular from 20% to 80%. In a particularly advantageous configuration, the mass proportion of all insulating components of the thermal insulation material is similar in the context of manufacturing tolerances. In this context, the mass proportion of individual components of the thermal insulation material changes in particular by drying processes. The mass proportions of the individual components of the thermal insulation material deviate advantageously by less than 30%, in particular less than 20%, from each other.

In order to achieve a minimal thermal conductivity, it is in particular provided that the mass proportion of the cellulose fibers from sanitary paper or decor paper amounts to more than 10%, in particular 30% to 70%, preferably approximately 50%.

Advantageously, the thermal insulation material comprises at least a third insulating component. Preferably, feathers, shavings of wood of coniferous trees or natural fibers are the third insulating component. In this context, the natural fibers can also be in the form of cellulose fibers and, for example, can be paper, wood, jute, hemp, flax or *miscanthus*. The cellulose fibers of the third insulating component can also be comprised of other paper materials than decor paper and sanitary paper, in particular recycled paper, for example, newspaper recycled paper. Recycled paper, for example, from newspapers, is easily available and inexpensive and well-suited and established as thermal insulation material. Recycled paper of other kinds of paper can be advantageous also. The cellulose fibers of the second component are comprised of another starting material than the cellulose fibers of the first component. The second and third components differ in regard to the starting material and can also be different in regard to the cellulose fibers, for example, their average length. It can also be provided that the third component comprises wood shavings wherein the wood shavings of the third component are either comprised of a different wood than the wood shavings of the first component or have a different shape, for example, a different length or average shaving thickness.

Advantageously, at least one component, in particular the cellulose fibers of the first component, in particular all cellulose fibers of the thermal insulation material, are treated with a flame retardant. Also, a treatment of other components, for example, of wood shavings or feathers, with flame retardant can be advantageous. In a preferred configuration all components of the thermal insulation material are treated with flame retardant. Also, a treatment with fungicides or other additives that increase the resistance of a component or several components of the thermal insulation material can be provided. Flame retardants and other resistance-improving agents are not understood as a component of the thermal insulation material in the meaning of the present application because they have no relevant insulating properties. As flame retardants, all available flame retardants or flame-inhibiting agents are conceivable.

In an advantageous configuration, the components are loosely mixed with each other. The thermal insulation material is therefore loose thermal insulation material that, for example, used as bulk material, is blown into cavities or can be processed in other ways. For example, processing by spray application, for example, with the aid of an adhesive or water, may be advantageous also.

In an alternative advantageous embodiment, the thermal insulation material is an insulation mat and the components are bonded to each other by means of a binding agent. The binding agent can be, for example, an adhesive or can be formed by hot melt fibers, in particular bi-component fibers. The components of the insulation mat form in this context advantageously no compact solid panel but the insulation mat comprises a plurality of voids that are formed between the components and that are not filled by the binding agent. The insulation mat is advantageously a flexible insulation mat.

The density of the insulation mat amounts to in particular 15 kg/m$^3$ to 120 kg/m$^3$, preferably 30 kg/m$^3$ to 60 kg/m$^3$.

In a further advantageous alternative configuration, the thermal insulation material is an insulation panel. The components of the insulation panel are advantageously bonded by a binding agent. The insulation panel is shape-stable and compact. It has been found that insulation panels with low density can be produced by use of cellulose fibers from sanitary paper or decor paper. It has also been found that, independent of the use of cellulose fibers from sanitary paper or decor paper, insulation panels with very low density can be produced by using wood shavings which are produced by a conical face milling process. The use of wood shavings that have been produced by a conical face milling process for an insulation panel constitutes an independent stand-alone inventive concept. A particularly low density can be achieved by use of shavings in which the fiber length direction of the wood is extending primarily in the longitudinal direction of the wood shavings. The density of the insulation panel of wood shavings in which the fiber length direction of the wood extends primarily in the longitudinal direction of the wood shavings amounts advantageously to not more than 500 kg/m$^3$, in particular not more than 400 kg/m$^3$. The wood shavings are advantageously produced by a conical face milling process. Insulation panels of identical properties that are produced of wood shavings produced by conventional methods, in which the fiber length direction of the wood extends transverse to the longitudinal direction of the wood shavings, have in contrast thereto usually a density in the magnitude of approximately 600 kg/m$^3$.

For a method for producing a thermal insulation material with wood shavings and cellulose fibers, it is provided that the wood shavings are produced by chipping wood in the moist state and that the wood chips with a residual moisture of at least 15%, in particular at least 20%, are mixed with the cellulose fibers after chipping. Advantageously, all components of the thermal insulation material are mixed in the moist state of the wood shavings of the first component and in particular also of the wood shavings of further components with a residual moisture of the wood shavings of at least 15%, in particular at least 20%.

Up to now it has been assumed that the wood shavings prior to mixing with further components are to be dried. It has however now been found that mixing in the moist state of the wood shavings is possible also so that the drying step can be omitted. Mixing of the wood shavings in the moist state with cellulose fibers is in particular advantageous when a component already contains flame retardants or other additives. By mixing of the components in the moist state of the wood shavings, a migration is achieved, for example, of the flame retardant, in particular from already pretreated cellulose fibers to the non-pretreated component or components. Cellulose fibers are in particular already pretreated when they are produced from paper, for example, from sanitary paper or decor paper. By mixing the components in the moist state, the required flame retardant quantity which still has to be added to the thermal insulation material can be significantly reduced. It has been found that the same flammability rating can be obtained with a flame retardant quantity which is cut in half relative to the mixture of dry components.

Cellulose fibers from paper, in particular from sanitary paper or decor paper, have a very large surface area. In particular, cellulose fibers from paper accelerate the drying action of the wood shavings due to their hygroscopic properties and due to their large surface area. The moisture of the shavings is transported away by the cellulose fibers and is no longer available for microorganisms such as molds.

The wood shavings are advantageously produced by chipping of moist wood, in particular wood fresh from the forest. It has been found that, when chipping moist wood, in particular wood fresh from the forest, reduced settling densities of the shavings can be achieved and shavings with advantageous smooth surface can be produced. At the same time, the energy that is required for chipping moist wood is less than the energy required for chipping dry wood. The shavings chipped from moist wood are mixed according to the invention without an additional drying step with the at least one further component. Wetting the wood shavings, for example, for activation of a binding agent by means of steam or water, can be provided. Preferably, no wetting of the wood shavings takes place however.

Advantageously, the moisture contents of the cellulose fibers with possibly added additives such as flame retardants, fungicides, binding agents or the like amounts to at most 18% when mixing the components. The cellulose fibers can therefore be moist but not wet. No slurrying of the cellulose fibers takes place. In this way, the great volume of the cellulose fibers and the comparatively minimal density of the thermal insulation material are maintained.

Advantageously, aside from possibly added additives such as flame retardants, fungicides or the like that may be diluted with water or dissolved in water, no additional water is added. Aside from possibly added liquid additives, the moisture of the thermal insulation material results only from the moisture of the wood fresh from the forest.

In a particularly advantageous configuration, the wood shavings are produced by chipping a log by means of a conical face milling cutter wherein the adjusting angle of the conical face milling cutter is 2° to 45°, in particular 10° to 30°, and particularly preferred approximately 20°. The axis of rotation of the conical face milling cutter in the viewing direction of the longitudinal center axis of the log is slanted relative to the processing surface at an inclination angle wherein the sum of inclination angle and adjusting angle amounts to 90°. A conical face milling cutter is a milling tool where the cutting edges are arranged on a conical surface that is of rotational symmetry relative to the axis of rotation. The conical surface is oriented parallel to the workpiece surface so that the axis of rotation of the conical face milling cutter relative to the workpiece surface extends at a slant. In order to be able to produce wood shavings in which the fiber orientation of the wood primarily extends in longitudinal direction of the wood shavings, it is provided that the region of the cone of the conical face milling cutter which is in contact with the log is oriented parallel to the longitudinal center axis of the log. In a view in viewing direction parallel to the processing surface and perpendicular to the longitudinal center axis of the log, the axis of rotation of the conical face milling cutter is positioned relative to the longitudinal center axis advantageously at an angle of 90°.

In case of a panel, it is provided that the panel comprises wood shavings that are bonded to each other by a binding agent. The wood shavings are produced by chipping a log by means of a conical face milling cutter. It has been found that by use of wood shavings, produced by a conical face milling cutter, panels can be produced that exhibit a significantly reduced density while having comparative mechanical properties in comparison to panels produced from conventional wood shavings, for example, in comparison to OSB panels. The density of the panel amounts advantageously to not more than 500 kg/m$^3$, in particular not more than 400 kg/m$^3$.

BRIEF DESCRIPTION OF THE DRAWINGS

Embodiments of the invention will be explained in the following with the aid of the drawing.

DESCRIPTION OF PREFERRED EMBODIMENTS

Figure 1:
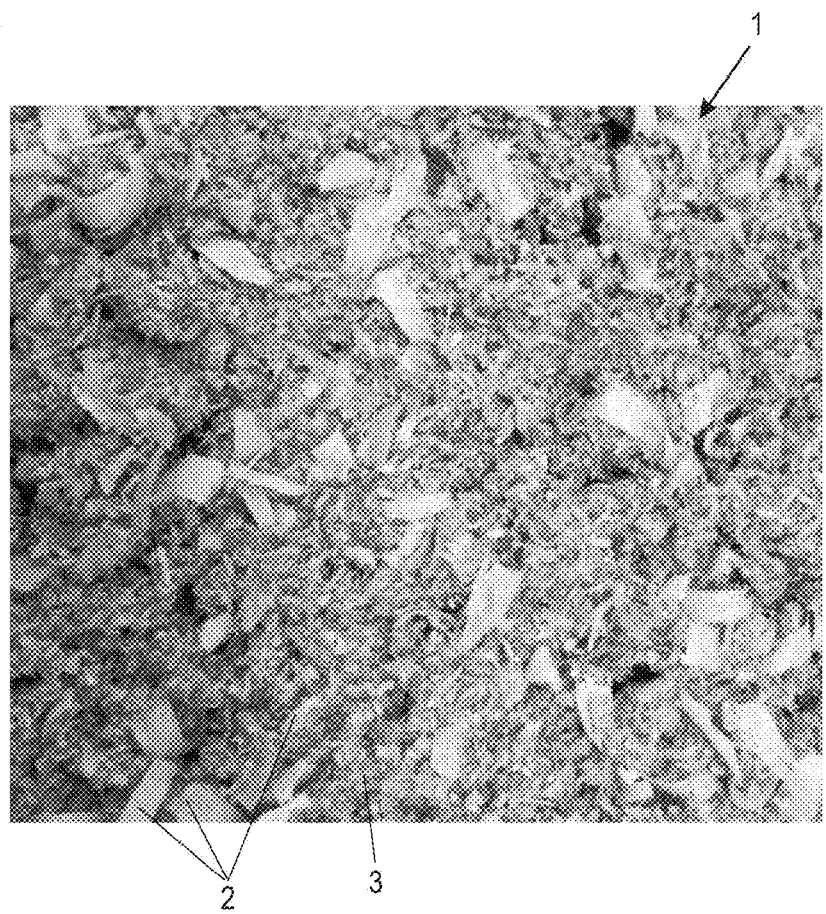
FIG. 1 is an illustration of the thermal insulation material according to the invention.

FIG. 1 shows thermal insulation material 1 which is present in loose form and, for example, is to be processed as bulk material or is to be blown into the cavities of buildings. In an alternative embodiment, the thermal insulation material 1 can also be an insulation mat, is described in regard to FIG. 4. The thermal insulation material 1 comprises wood shavings 2 and cellulose fibers 3 which are loosely mixed which with each other. The wood shavings 2 form voids in which the cellulose fibers 3 are arranged. The wood shavings 2 form thus a support structure for the cellulose fibers 3. In this way, the settling density of the thermal insulation material 1 is significantly reduced. The wood shavings 2 have a lower density than the cellulose fibers 3. The wood shavings 2 form a first component of the thermal insulation material 1 and the cellulose fibers 3 form a second component of the thermal insulation material 1.

The wood shavings 2 of the first component in the embodiment are made of wood from deciduous trees. The wood from deciduous trees is preferably wood of the willow family, in particular of poplar (*populous*), aspen (*populus*

*tremula*) or birch (*betula*). In an alternative configuration, the wood shavings 2 can also be made from wood of coniferous trees. The cellulose fibers 3 of the second component are produced from decor paper or sanitary paper. The cellulose fibers 3 of the second component are advantageously comparatively short. In particular, cellulose fibers of sanitary paper have moreover a lower proportion of fillers such as in particular dust.

The cellulose fibers 3 comprise advantageously a maximal fiber length of 12 mm.

The wood shavings 2 are designed such that the fiber length direction of the wood extends primarily in the longitudinal direction of the wood shavings 2. The wood shavings intersect therefore only a few tree rings, in particular no tree rings, of the log. Therefore, the wood shavings have a high elasticity and flexibility and at the same time a reduced breaking tendency.

Figure 2:
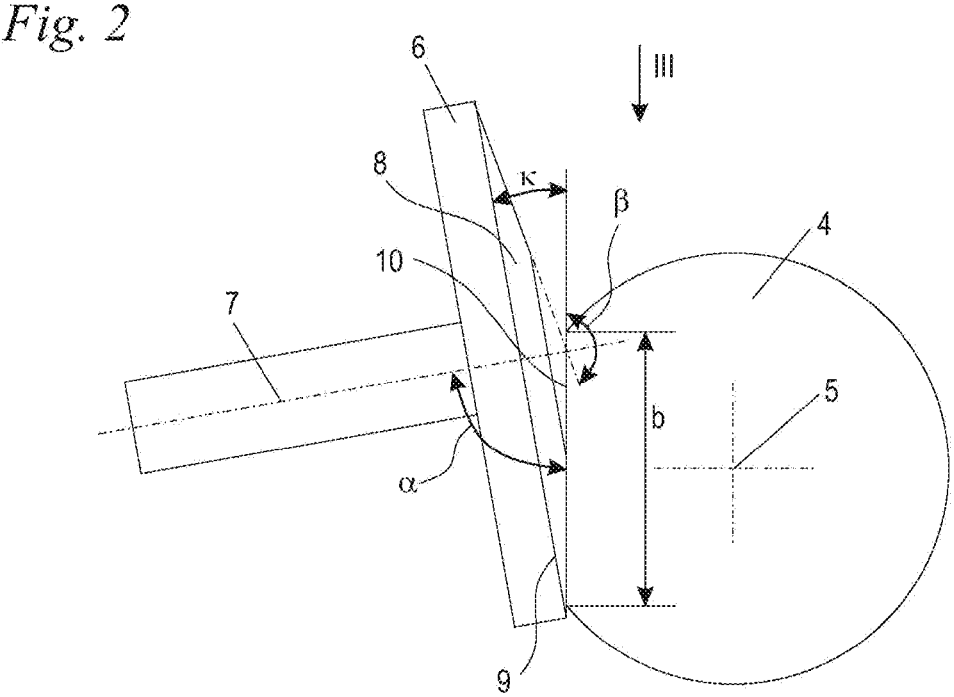
FIG. 2 is a schematic illustration of a method for producing advantageous wood shavings for the thermal insulation material.
Figure 3:
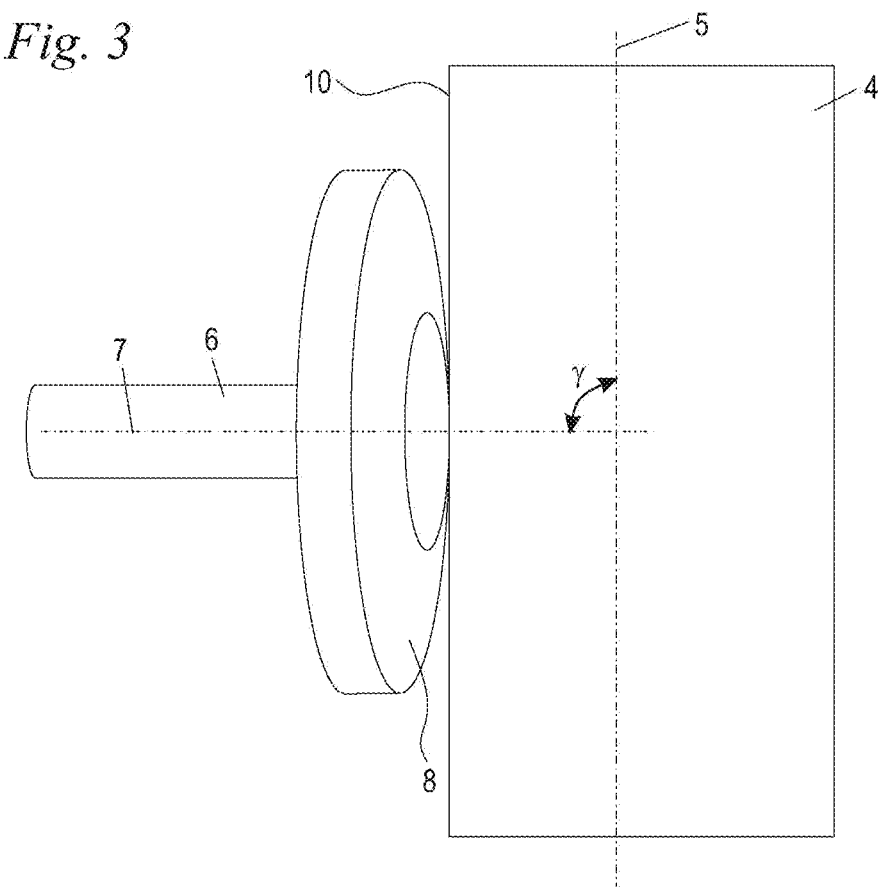
FIG. 3 is a schematic plan view of the arrangement of FIG. 2 in the direction of arrow III in FIG. 2.

The manufacture of the wood shavings 2 is schematically illustrated in FIGS. 2 and 3. FIG. 2 shows schematically a log 4 with the longitudinal center axis 5. The log 4 comprises a surface 10 to be worked. For producing the wood shavings 2, a conical face milling cutter 6 is provided which engages the surface 10 to be worked and chips the log 4. The conical face milling cutter 6 is rotatably supported about an axis of rotation 7. The conical face milling cutter 6 comprises a conical surface 8 extending rotation-symmetrical about the axis of rotation 7. In the viewing direction parallel to the longitudinal center axis 5 shown in FIG. 2, the axis of rotation 7 of the conical face milling cutter 6 is slanted at an angle $\alpha$ relative to the surface 10 to be worked of the log 4. The angle $\alpha$ amounts advantageously to 45° to 88°, in particular 60° to 80°, and particularly preferred approximately 70°. The conical face milling cutter 6 comprises an adjusting angle $\kappa$ which corresponds to the inclination of a base surface 9 of the cone relative to the cone surface 8. The base surface 9 is in this context perpendicular to the axis of rotation 7 of the conical face milling cutter 6. The adjusting angle $\kappa$ amounts advantageously to 2° to 45°, in particular 10° to 30°. It has been found to be particularly advantageous when the adjusting angle $\kappa$ is approximately 20°. The inclination angle $\alpha$ and the adjusting angle $\kappa$ together amount to 90°. The cone angle $\beta$ which is measured between oppositely positioned regions of the cone surface 8 amounts advantageously to 90° to 176°, in particular 120° to 160°, and particularly preferred approximately 140°. The width b of the log 4 in the region in which the wood shavings 2 are produced amounts advantageously to at least 5 mm.

FIG. 3 shows the arrangement of FIG. 2 in a plan view in a viewing direction parallel to the surface 10 to be worked and perpendicular to the longitudinal center axis 5 of the log 4. In this viewing direction, the axis of rotation 7 is positioned relative to the longitudinal center axis 5 at an angle $\gamma$ which amounts to 45° to 135°, in particular 75° to 105°, and preferred approximately 90°.

The wood shavings 2 have advantageously an average shaving thickness of approximately 0.1 mm to 5 mm. Wood shavings 2 produced by the conical face milling cutter 6 comprise advantageously an average shaving thickness which results from the tooth feed rate multiplied by sink wherein the tooth feed rate is the feeding rate divided by the number of cutting edges and the rotary speed of the conical face milling cutter 6. In this context, a cutting edge can be comprised of a plurality of cutting inserts. A cutting edge which continues across the center of the cone to the opposite side of the cone is regarded as one cutting edge.

In the embodiment, the cellulose fibers 3 are made from sanitary paper or decor paper. In an advantageous embodiment, the cellulose fibers 3 are treated with a flame retardant. In addition or alternatively, a treatment with other resistance-increasing agents, in particular with fungicides, can be provided.

When producing the thermal insulation material 1, the wood shavings 2 are advantageously produced by chipping moist wood, in particular wood fresh from the forest, and in particular by means of a conical face milling cutter 6. In this way, a very smooth surface and high elasticity of the wood shavings 2 result. After chipping, the wood shavings 2 are mixed in the moist state with the second component, i.e., the cellulose fibers 3, as well as with possible further components of the thermal insulation material 1. At the time of mixing, the wood shavings 2 comprise a residual moisture of at least 20%. It has been found that by mixing the cellulose fibers 3 with moist wood shavings 2, a simpler migration of the flame retardant from the cellulose fibers 3 to the wood shavings 2 is realized. In case of dry components, this migration is slower so that greater quantities of flame retardant must be added in order to achieve the desired fire resistance of the thermal insulation material 1 already shortly after mixing. By mixing the components in the moist state, the required quantity of flame retardant can be reduced without the duration until use of the thermal insulation material 1 being extended. The total moisture of the thermal insulation material when mixing the components amounts to at most 15%. The components are therefore not wet. In particular, the shavings of wood fresh from the forest are mixed without further drying or wetting steps with the dry cellulose fibers with addition of flame retardant diluted with water.

For an alternative advantageous composition of the thermal insulation material 1, it is provided that the thermal insulation material 1 comprises a third insulating component in addition to the wood shavings 2 and the cellulose fibers 3. Advantageously, the mass proportion of the wood shavings 2, of the cellulose fibers 3, and of the third insulating component amounts to 10% to 80% in each case. In particular, the mass proportions of the three components differ by less than 30%, in particular by less than 20%, from each other.

The third component can advantageously be formed by cellulose fibers wherein the cellulose fibers of the third component are produced from another raw material than the cellulose fibers of the second component. For example, the second component can be formed by cellulose fibers of another type of paper. It is particularly advantageous when the cellulose fibers of the second component are from sanitary paper and the cellulose fibers of the third component from decor paper. A thermal insulation material of the wood shavings, cellulose fibers from decor paper, and cellulose fibers from sanitary paper is provided with particularly advantageous properties when the thermal insulation material has a mass proportion of approximately 40% to 60%, in particular of approximately 50%, of wood shavings and a mass proportion of approximately 40% to 60% of cellulose fibers from sanitary paper and decor paper. Preferably, the mass proportion of the cellulose fibers from sanitary paper and the mass proportion of cellulose fibers from decor paper amount in particular to approximately 20% to 30%, in particular approximately 25%. Other proportions of cellulose fibers from sanitary paper and cellulose fibers from decor paper can also be advantageous however.

It can however also be provided that the cellulose fibers of the third component are produced, for example, from recycled paper. The third component in an alternative embodiment can be comprised, for example, of cellulose fibers from natural fibers such as wood, jute, hemp, flax or miscanthus. An advantageous composition of a thermal insulation material comprises a mass proportion of approximately 30% to 70%, preferably approximately 30% to 60%, of shavings. The thermal insulation material comprises in addition cellulose fibers from wood and cellulose fibers from paper, at least partially from decor and/or sanitary paper, in arbitrary mass proportions. In an alternative embodiment, a component of the thermal insulation material can be formed by feathers.

It can also be provided that the third component is formed by natural fibers themselves, i.e., not of cellulose fibers from the natural fibers. In this way, the density of the thermal insulation material 1 relative to the density of the cellulose fibers is reduced. The third component can also be formed by shavings of another type of wood than the wood shavings of the second component. For example, the wood shavings of the second component can be made from a willow family member and the wood shavings of the third component from wood of coniferous trees. The wood shavings of a willow family member have a particularly low settling-safe density. The shavings of wood from coniferous trees have a characteristic wood odor. By use of shavings of different types of wood, a thermal insulation material with particularly advantageous properties can be provided. An advantageous composition comprises a mass proportions of approximately 40% to 45% of shavings of wood of deciduous trees, in particular from the willow family, preferably from poplar, a mass proportion of less than 10%, in particular of 5% to 10%, of shavings of wood of coniferous trees, and cellulose fibers from sanitary or decor paper as well as further components in arbitrary composition. Already by a comparatively minimal proportion of shavings of wood of coniferous trees, a thermal insulation material with characteristic wood odor can be produced. It can also be provided that all shavings of the thermal insulation material are produced from wood of coniferous trees.

In a further advantageous embodiment, the thermal insulation material comprises at least one further fourth component in addition to the first, the second, and the third components. Additional components may be advantageous also.

The thermal conductivity of the loose thermal insulation material 1 amounts advantageously to less than 0.040 W/(m*K), in particular 0.036 W/(m*K) to 0.040 W/(m*K).

Figure 4:
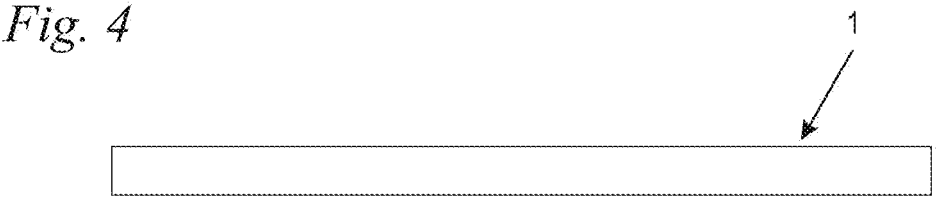
FIG. 4 is a schematic illustration of a further embodiment of the thermal insulation material according to the invention.

In a further alternative configuration, the thermal insulation material 1 is in a bonded form, as is illustrated schematically in FIG. 4. The components of the thermal insulation material 1 are advantageously bonded to each other by a binding agent, in particular by an adhesive or hot melt fibers such as, for example, bi-component fibers. The binding agent advantageously produces a flexible connection between the components of the thermal insulation material 1.

The thermal insulation material 1 illustrated in FIG. 4 is in particular an insulation mat. The insulation mat comprises advantageously a comparatively minimal density. The density of the insulation mat amounts to in particular 15 kg/m³ to 120 kg/m³, preferably 30 kg/m³ up to 60 kg/m³. The components and the composition of the components of the insulation mat correspond to the compositions described in regard to the loose thermal insulation materials 1 wherein the insulation mat additionally contains the binding agent. The insulation mat is advantageously flexible and comprises a plurality of voids between the components. The voids are not filled with the binding agent. The thermal conductivity of the thermal insulation material 1 embodied as an insulation mat amounts advantageously to less than 0.040 W/(m*K), in particular 0.036 W/(m*K) to 0.040 W/(m*K).

In an alternative embodiment, the thermal insulation material 1 illustrated in FIG. 4 is embodied as an insulation panel. The insulation panel comprises in this context a comparatively minimal density. The density of the insulation panel amounts advantageously to not more than 500 kg/m³, in particular not more than 400 kg/m³. The insulation panel is advantageously shape-stable and compact and comprises only very few or only negligibly small air-filled voids.

Preferably, the mass proportion of each insulating component of the thermal insulation material amounts to 10% to 90%. In case of a thermal insulation material 1 of at least three insulating components, the mass proportion of each of the insulating components advantageously amounts to 10% to 80% and for a thermal insulation material of four components advantageously 10% to 70%. Preferably, the mass proportion of each insulating component amounts to at least 10%, in particular at least 20%. Mass proportions which differ from each other by at most 30%, in particular at most 20%, are considered similar mass proportions. In case of a thermal insulation material 1 of two components, the mass proportion of each component amounts advantageously to 35% to 65%, in particular 40% to 60%. In case of a thermal insulation material 1 of three components, the mass proportion of each component amounts advantageously to 20% to 50%, in particular 25% to 45%. Advantageously, no component has a mass proportion of more than 90%.

The mass proportion of the cellulose fibers 3 from sanitary paper or decor paper amounts advantageously to more than 10%, in particular 30% to 70%, preferably approximately 50%. Particularly advantageously, the thermal insulation material comprises a mass proportion of 40% to 60%, in particular of approximately 50%, of shavings, independent of the further components of the thermal insulation material.

Figure 5:
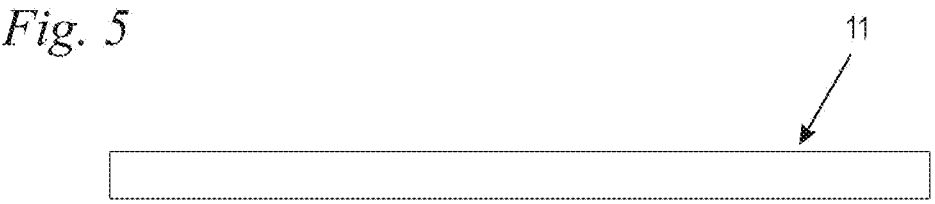
FIG. 5 is a schematic illustration of a panel.

FIG. 5 shows an embodiment variant of a panel 11 comprising wood shavings 2. The wood shavings 2 are bonded to each other by a binding agent. The binding agent can be, for example, an adhesive, in particular resins, or hot melt fibers such as, for example, bi-component fibers. As binding agents, conventional binding agents used for OSB panels can be provided. The binding agent provides advantageously a fixed connection between the components of the thermal insulation material 1.

In an advantageous embodiment variant, the panel 11 comprises no cellulose fibers 3. In an alternative variant, it is provided that the panel 11 comprises cellulose fibers 3, in particular cellulose fibers 3 from sanitary paper or decor paper. The panel 11 can be designed as a thermal insulation panel. The wood shavings 2 are produced by means of a conical face milling cutter 6 (FIGS. 2 and 3). In this way, the wood shavings 2 are very elastic and flexible.

The fiber length direction of the wood extends primarily in longitudinal direction of the wood shavings 2. The density of the panel 11 amounts advantageously to not more than 500 kg/m³, in particular not more than 400 kg/m³. The thermal conductivity of the panel 11 is advantageously less than the thermal conductivity of OSB panels. The panel 11 is advantageously shape-stable and compact and comprises only very few or negligibly small air-filled voids.

The wood shavings 2 of the panel 11 are in particular made of wood of deciduous trees, preferably of wood of the willow family, in particular wood of poplar (*populus*), aspen (*populus tremula*), or birch (*betula*). The wood shavings 2 of the panel 11 can however be produced also partially or exclusively from wood of coniferous trees. Advantageously, the wood shavings 2 of the panel 11 are produced by chipping moist wood fresh from the forest. The wood shavings 2 of the panel 11 are advantageously produced as described above in connection with the wood shavings 2 of the thermal insulation material 1. The wood shavings 2 are in particular produced by a conical face milling method, as described above.

The specification incorporates by reference the entire disclosure of European priority document 18 166 567.0 having a filing date of Apr. 10, 2018.

While specific embodiments of the invention have been shown and described in detail to illustrate the inventive principles, it will be understood that the invention may be embodied otherwise without departing from such principles.

What is claimed is:

1. A method for producing a thermal insulation material comprising a plurality of insulating components, wherein the plurality of insulating components include wood shavings as a first insulating component and cellulose fibers as a second insulating component, wherein the method comprises:
    producing the cellulose fibers from paper;
    producing the wood shavings by chipping wood in a moist state; and
    after chipping, mixing the wood shavings, comprising a residual moisture of at least 20%, with the cellulose fibers without wetting the wood shavings prior to mixing.

2. The method according to claim 1, comprising:
    chipping a log with a conical face milling cutter for producing the wood shavings, adjusting an adjusting angle of the conical face milling cutter for chipping of 2° to 45°, and positioning an axis of rotation of the conical face milling cutter for chipping aslant at an inclination angle relative to a surface to be worked of the log, when viewed in a viewing direction of a longitudinal center axis of the log, wherein the inclination angle and the adjusting angle together amount to 90°.

3. The method according to claim 1, further comprising selecting the paper for producing the cellulose fibers from the group consisting of decor paper and sanitary paper, wherein the decor paper is a specialty paper for surface refinement of wood materials and wherein the sanitary paper is selected from the group consisting of tissue paper and paper produced by an airlaid method.

4. The method according to claim 1, further comprising selecting the wood for producing the wood shavings from wood fresh from a forest.

5. The method according to claim 1, further comprising selecting the cellulose fibers to have a maximum fiber length of 12 mm.

6. The method according to claim 1, further comprising selecting the wood for producing the wood shavings from wood of the willow family.

7. The method according to claim 6, wherein the wood of the willow family is selected from the group consisting of poplar, aspen, and birch.

8. The method according to claim 1, further comprising chipping the wood such that a fiber length direction of the wood shavings extends primarily in a longitudinal direction of the wood shavings.

9. The method according to claim 1, further comprising selecting a mass proportion of each one of the plurality of insulating components to an amount of 10% to 90%.

10. The method according to claim 1, further comprising mixing the wood shavings after chipping with at least a third insulating component of the plurality of insulting components.

11. The method according to claim 1, further comprising mixing at least one of the plurality of insulating components, but not the first insulating component, with a flame retardant diluted with water.

12. The method according to claim 1, further comprising bonding the plurality of insulating components to each other by a binding agent to form the thermal insulation material as an insulation mat comprising a density of 15 $kg/m^3$ to 120 $kg/m^3$.

13. The method according to claim 1, further comprising bonding the plurality of insulating components to each other by a binding agent to form the thermal insulation material as an insulation panel comprising a density of not more than 500 $kg/m^3$.

* * * * *